(12) United States Patent
Kato et al.

(10) Patent No.: US 6,302,676 B1
(45) Date of Patent: Oct. 16, 2001

(54) APPARATUS FOR MANUFACTURING SLIDE FASTENER CONTINUOUS ELEMENT ROW

(75) Inventors: Takashi Kato; Yoshihiro Kousaka; Shigeru Imai, all of Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/393,984

(22) Filed: Sep. 10, 1999

(30) Foreign Application Priority Data

Sep. 22, 1998 (JP) ................................................. 10-268599

(51) Int. Cl.[7] .................................................. B29C 53/64
(52) U.S. Cl. .......................... 425/335; 425/391; 425/393; 425/814
(58) Field of Search ................................ 425/814, 335, 425/391, 393, 341, 343

(56) References Cited

U.S. PATENT DOCUMENTS

| 3,077,001 | * | 2/1963 | Yoshida | 425/324.1 |
| 3,431,337 | * | 3/1969 | Heimberger | 264/281 |
| 3,680,604 | * | 8/1972 | Frohlich et al. | 140/92.1 |
| 3,770,361 | * | 11/1973 | Heimberger | 425/445 |
| 4,096,225 | * | 6/1978 | Kowalski | 264/167 |
| 4,501,547 | * | 2/1985 | Mizuhara et al. | 425/391 |
| 5,043,125 | * | 8/1991 | Fukuroi | 264/146 |
| 5,705,114 | * | 1/1998 | Wakashima et al. | 264/281 |

* cited by examiner

Primary Examiner—Nam Nguyen
Assistant Examiner—Joseph S. Del Sole
(74) Attorney, Agent, or Firm—Finnegan, Henderson, Farabow, Garrett & Dunner, L.L.P.

(57) ABSTRACT

The present invention provides an apparatus for manufacturing a slide fastener spiral continuous element row wherein a monofilament is carried on a mandrel while ensuring an accurate pitch of elements even in a high-speed operation and a stepped form of an upper leg portion can be accurately formed at a predetermined portion of each the element. In order to continuously manufacture the slide fastener spiral element row from the continuous monofilament made of synthetic resin, the monofilament transferred continuously is wound spirally around the mandrel and carried while being retained between screw grooves of opposed screws. Then, a coupling head is formed by hitting a portion of the spiral monofilament carried on the mandrel by a pressing roller, the portion corresponding to the coupling head. After that, a stepped upper leg portion is formed by pressing a portion of the spiral monofilament by a rotary hammer at a predetermined position on the mandrel, the portion corresponding to the upper leg portion.

7 Claims, 6 Drawing Sheets

APPARATUS FOR MANUFACTURING SLIDE FASTENER CONTINUOUS ELEMENT ROW

BACKGROUND OF THE INVENTION

1. Field of the Invention

The present invention relates to a method and an apparatus for manufacturing a coil-shaped continuous element row applied to a slide fastener, and more particularly to a rational and productive method and an apparatus for manufacturing a continuous coil-shaped element row, which are suitable for sequential bending and forming of upper leg portions of a large number of element units to have steps by pressing and deforming, the element units comprising coupling heads and upper and lower leg portions connected through joint portions.

2. Description of the Related Art

Each element unit (herein after, referred to as "element") of a slide fastener continuous element row manufactured by turning a monofilament made of synthetic resin into a coil shape comprises a coupling head extending perpendicularly to the element row and upper and lower leg portions extending from end portions of the coupling head in a width direction of a fastener tape and the upper and lower leg portions of the adjacent elements are coupled through a joint portion to form the continuous element row.

There are various shapes of a ring-shaped element when the element row is cut at the joint portion and viewed from a side. FIGS. 9 to 12 show the representative shapes. FIG. 9 shows an extremely common shape, i.e., so called "an egg shape". A core thread 2' may be inserted through an inside space of the egg shape in an element row direction. FIG. 10 shows an element shape wherein upper and lower leg portions L'-1 and L'-2 are close to each other such that a space between the upper and lower leg portions L'-1 and L'-2 is extremely small and that the upper and lower leg portions L'-1 and L'-2 are almost in contact with each other. Such an element row is used especially for thin outerwear and underwear. FIG. 11 shows a shape co-called "a tennis racket type" wherein portions of the upper and lower leg portions L'-1 and L'-2 close to the coupling head H' bulge outward and portions of both the leg portions L'-1 and L'-2 close to the joint portion J' are pressed such that there is almost no space therebetween. With regard to the continuous element row comprising spiral elements in such a shape, the core thread 2' may be inserted through a hollow portion of the element row.

An element shape shown in FIG. 12 is a modification of the above "tennis racket types". In other words, the lower leg portion L'-2 of the element E' extends substantially straight from the coupling head H' and the upper leg portion L'-1 is bent and deformed to be stepped at some midpoint thereof so as to be closer to the lower leg portion L'-2. Because of such a shape, a sewing yarn is disposed in an area of an upper face the upper leg portion L'-1 of each the element E', the area extending from the stepped portion toward the joint portion J', when the fastener element row is sewn on a longitudinal edge portion of the fastener tape. As a result, the sewing yarn does not project from a surface of the fastener element row and is prevented from being damaged due to its contact with other member in use of the slide fastener. Also in opening and closing operations of the slide fastener by a slider, it is possible to prevent wear in the sewing yarn due to the sliding movement of the slider and to prevent the fastener element row from falling off the fastener tape. On the other hand, because the lower leg portion L'-2 which is in contact with a surface of the fastener tape is substantially straight, the element can be fixed with the entire lower leg portion L'-2 in close contact with the fastener tape. As a result, necessary securing strength can be easily obtained and a fixed attitude of the element is stabilized.

Coil-shaped element rows in a form of the "tennis racket type" shown in FIG. 11 and in a modified form of the "tennis racket type" shown in FIG. 12 are manufactured by methods disclosed in Japanese Utility Model Publication No. 42-14901, Japanese Patent Publication No. 54-20895, Japanese Patent Publication No. 49-23874, and the like, for example.

According to the Japanese Utility Model Publication No. 42-14901, a continuous monofilament is spirally wound around a mandrel, the wound monofilament is transferred by a pair of screws which face each other with the mandrel being disposed therebetween, and at the same time, portions of the monofilament corresponding to the upper and lower leg portions are pressed by bottom faces of spiral grooves of the pair of screws into a narrowed shape. In other words, each the element is in the form of the "tennis racket type" wherein the upper and lower leg portions gradually approaches each other toward the joint portion.

The element form disclosed in the above Japanese Patent Publication No. 54-20895 and Japanese Patent Publication No. 49-23874 is a modification of the above "tennis racket type" shown in FIG. 11. Especially in the Japanese Patent Publication No. 49-23874, a continuous monofilament is spirally wound around a mandrel, the wound monofilament is pressed by one of a pair of pressing rollers which face each other with the mandrel being disposed therebetween to form coupling heads, and a portion of the upper leg portion near the joint portion is pressed in a narrowed shape toward the lower leg portion by the other of the pressing rollers to form a stepped portion, thereby bending and forming the upper leg portion into a stepped shape.

Therefore, according to the above Japanese Utility Model Publication No. 42-14901, the continuous element row is formed to have configuration as described above. Therefore, in order to reliably press and deform the portions to be upper and lower leg portions of the coil-shaped monofilament spirally wound around the mandrel into the narrowed shape by the bottom faces of the pair of opposed spiral grooves, a complicated cutting process such as for making a shape of a bottom face (groove depth) of the spiral grooves of the screws which gradually shallow is required.

On the other hand, according to the method for manufacturing the fastener element row disclosed in the Patent Publication No. 54-20895, the coupling head and the upper leg portion of each the element wound around the mandrel are pressed and deformed by the pair of pressing rollers. Because the pressing of the fastener element row is only carried out by the rotary rollers, the elements carried on the mandrel are subject to a sliding resistance of the mandrel and variation in pressing force of each the roller and a pitch of the elements is liable to be varied.

SUMMARY OF THE INVENTION

The present invention has been developed to solve the above problems, and specifically, it is an object of the invention to provide a method and an apparatus for manufacturing a slide fastener coil-shaped continuous element row wherein an accurate pitch of elements carried on a mandrel is ensured even in a high-speed operation and an accurate form of an upper leg portion can be formed at a predetermined position of each the element.

According to a first aspect of the invention, there is provided a method for continuously manufacturing a spiral slide fastener element row from a continuous monofilament made of synthetic resin and comprising the steps of spirally winding the continuous monofilament around a mandrel, carrying the monofilament wound around the mandrel while retaining the monofilament between opposed screws, forming coupling heads by pressing the carried spiral monofilament at a predetermined position of the mandrel, and forming stepped upper leg portions by pressing portions of the spiral monofilament formed, to have the coupling heads, at a predetermined position of the mandrel, the portions corresponding to the upper leg portions.

For example, the continuous monofilament which is made of synthetic resin and wound around a large spool is drawn out from the spool, passes through a filament passing hole formed in a peripheral edge portion of a disc-shaped guide rotating around a horizontal shaft, and is spirally wound around the mandrel extending concentrically with the horizontal shaft. The monofilament wound around the mandrel is carried forward while being spirally fitted in screw grooves of the pair of screws rotating in the same direction, the screws extending in parallel to the mandrel and facing each other with the mandrel disposed therebetween.

The mandrel has at its front half portion the coupling head forming portion comprising a pressing roller disposed in a direction to face the mandrel and a block-shaped receiving body disposed to face the pressing roller through the mandrel between the pair of opposed screws, for example. The portions of the spiral monofilament carried by the pair of screws are pressed in sequence by a peripheral face of the pressing roller to form the coupling head for each element of the slide fastener spiral element row, the portions corresponding to the coupling heads. In this case, it is preferable that the portions of the spiral monofilament corresponding to the coupling heads are heated and softened to such an extent that the portions can be plastically deformed in carrying of the monofilament. Needless to say, the coupling heads can be pressed and formed at ordinary temperature.

After the coupling heads are formed at the portions of the spiral monofilament corresponding to the coupling heads in this manner, the spiral monofilament is carried on the mandrel to the upper leg portion forming portion which is the next step by the screws. The upper leg portion forming portion has a pressing body disposed to face the portion of the slide fastener spiral element row corresponding to the upper leg portion and presses the portion corresponding to the upper leg portion in sequence with the pressing body to bend and form the upper leg portion in a stepped manner at its midpoint toward the lower leg portion such that a space between the upper and lower leg portions is narrowed. Therefore, a pressing face of the pressing body is formed to be bent into a substantially V shape and the mandrel has a substantially L shape in section at the upper leg portion forming portion. The pressing face of the pressing body is disposed along a bent face of the mandrel and only the upper leg portion of the monofilament is pressed and formed into the bent form between the pressing face and the bent face of the mandrel.

As described above, according to the invention, the slide fastener spiral element row is manufactured continuously from the straight monofilament, and furthermore, because the monofilament spirally wound around the mandrel is carried by the screws, a winding pitch of the monofilament is constant. Moreover, in pressing and forming of the coupling head and the upper leg portion, because pressing force of the coupling head is received by the receiving body and pressing force of the upper leg portion is received by the mandrel, for example, desired forms can be formed accurately and efficiently.

The winding pitch is preferably fixed by heating or the like when the form of the slide fastener element row after forming is finalized.

According to a second aspect of the invention, there is provided an apparatus suitable for continuously manufacturing the slide fastener spiral element row, which comprises a pair of screws disposed in parallel to each other in a longitudinal direction and rotating in the same direction, a mandrel extending in parallel to the screws between the opposed screws and having a substantially rectangular shape or an oval shape in section, a coupling head forming portion disposed between the pair of screws so as to sandwich the mandrel and having a receiving body on one side and a pressing body for forming coupling heads of elements on the other side, and an upper leg portion forming portion disposed on a front end side of the mandrel so as to be orthogonal to the coupling head forming portion. In the apparatus, the front end side of the mandrel where the upper leg portion forming portion is disposed is formed into a thin portion having a substantially L shape in section, and the upper leg portion forming portion has an upper leg portion forming pressing body for pressing and deforming the monofilament in a stepped manner substantially along an inner face of the thin portion so as to eliminate a space formed between the thin portion and an inner peripheral edge of the monofilament wound around the thin portion.

Preferably, the mandrel has a guide groove for guiding a core thread and formed continuously from a base end portion to the thin portion of the mandrel, and the core thread is inserted through the guide groove when the slide fastener spiral element row is manufactured in the above manner. Therefore, the monofilament is wound around the mandrel and the core thread inserted through the guide groove formed throughout a length of the mandrel and the slide fastener spiral element row is formed with the core thread being inserted inside the element row. The guide groove is formed in a surface of the substantially L-shaped thin portion opposite to the bent face.

Preferably, the upper leg portion forming portion comprises one of the screws and a rotary hammer disposed to face a trough portion of the screw. In other words, one of the pair of screws has only a screw shaft portion and lacks a screw portion where the rotary hammer is disposed and a screw groove of the other screw is disposed to face a disposing position of the rotary hammer. Therefore, the pressing force is received by the screw groove portion into which the lower leg portion is fitted when the upper leg portion is pressed by the pressing body as described above, thereby bending and forming the upper leg portion accurately.

Further preferably, the rotary hammer comprises a truncated cone-shaped disc and the rotary hammer is disposed such that an axial line of a rotary shaft of the rotary hammer crosses at an acute angle a straight extension connecting rotational centers of the pair of screws. By forming the rotary hammer as described above, an inclined peripheral face of the rotary hammer faces the upper leg portion. As a result, the rotary shaft interferes with only one of the pair of screws and the interference can be avoided because the screw lacks the screw portion interfering with the rotary shaft and has only the rotary shaft at the same position. Because the upper leg portion can be satisfactorily supported through the lower leg portion by the opposed screw groove of the other screw as described above, the pressing force of the rotary hammer acting on the upper leg portion can be effectively transmitted to bending and forming.

And preferably, a pressing roller is used for the coupling head forming pressing body. The pressing roller comprises a polygonal disc and a peripheral face of the disc has flat faces and arc faces bulging outward which are arranged alternately. The coupling heads are formed by hitting the portions of the spiral monofilament corresponding to the coupling heads in sequence by the arc faces. By synchronizing rotational speeds of the pressing roller and the screws, efficient and continuous forming of the coupling heads is realized.

Further preferably, the peripheral edge portion constituting pressing faces of the rotary hammer or the pressing roller into polygons when the pressing roller and the rotary hammer are viewed in its rotary shaft direction. As a result, efficient and continuous forming of the fastener element is realized.

DESCRIPTION OF THE PREFERRED EMBODIMENTS

Figure 1:
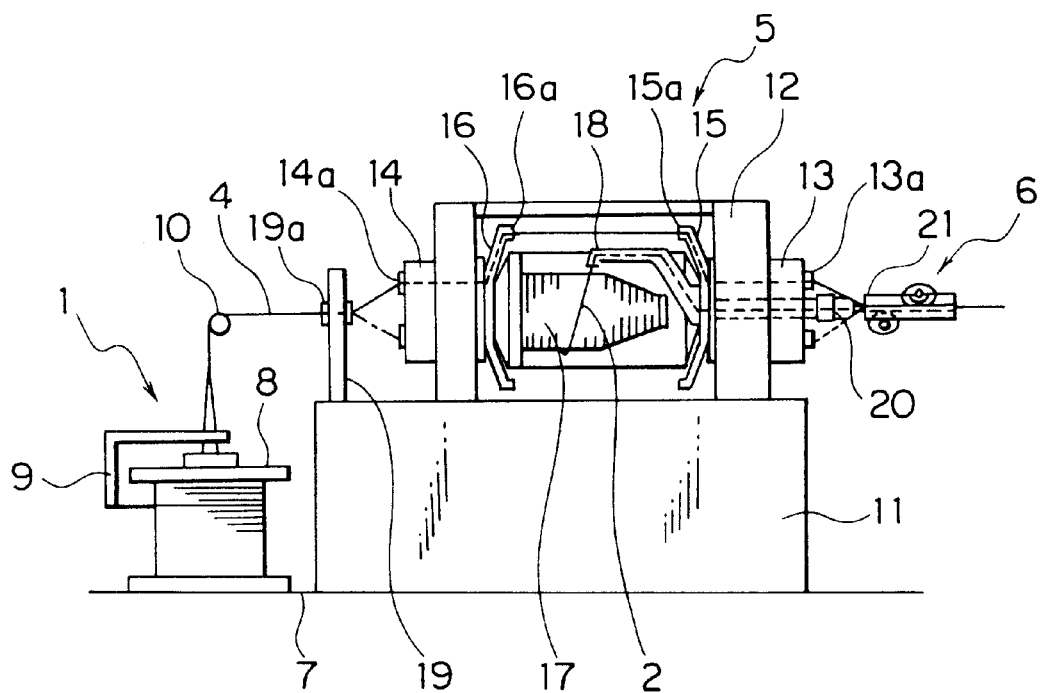
FIG. 1 is a diagram schematically showing a general structure of an example of an apparatus for manufacturing a slide fastener spiral continuous element row according to the present invention.

Preferred embodiments of the present invention will be specifically described below based on examples shown in the drawings.

FIG. 1 is a diagram schematically showing a general structure of an apparatus for manufacturing a slide fastener coil-shaped continuous element row according to the invention. As shown in FIG. 1, the apparatus for manufacturing the coil-shaped continuous element row of the invention comprises a monofilament supply unit 1, a winding unit 5 for winding a monofilament 4 into a coil shape around a mandrel 21 while inserting a core thread 2 through a central portion of the coil, and an element forming unit 6 for forming coupling heads and upper and lower leg portions of elements into predetermined forms on the monofilament 4 wound around the mandrel 21.

The monofilament supply unit 1 has a large spool 8 around which the monofilament 4 is wound and which is placed and fixed onto a floor face 7 with its winding pipe being vertical, a flyer 9 which is supported on an upper end of the winding pipe of the spool 8 for rotation in a horizontal plane around a winding core of the spool 8 and which guides the monofilament 4 unwound from the spool 8 onto an axial line of the winding core, and a guide roller 10 disposed above the winding pipe to turn the monofilament 4 drawn out vertically and upward into a horizontal direction.

The winding portion 5 has a pedestal 11, a hollow rectangular frame 12 disposed on the pedestal 11, a pair of rotary bodies 13 and 14 which are disposed for rotating in synchronism with each other on outer wall faces of front and rear wall portions of the frame 12 and which respectively have monofilament guide holes 13a and 14a, monofilament guide bodies 15 and 16 which are disposed on inner wall faces of the front and rear wall portions of the frame 12 and integrally rotating with the rotary bodies 13 and 14, a core thread bobbin 17 removably fixed to a shaft center of the rear monofilament guide body 16, a core thread drawing-out body 18 freely rotating to guide a core thread 2 drawn out from the core thread bobbin 17 to the front monofilament guide body 15 and a shaft center hollow portion of the front rotary body 13, a guide column 19 standing between the guide roller 10 and the frame 12, a mandrel holder 20 fixed to the shaft center of the front rotary body 13, and the rod-shaped mandrel 21 extending forward and horizontally from the mandrel holder 20.

The front and rear rotary bodies 13 and 14 are driven for rotation in synchronism with each other by a driving source (not shown). A guide hole 19a for guiding the monofilament 4 is defined in an upper end of the guide column 19. Monofilament guide holes 15a and 16a respectively communicating with the monofilament guide holes 13a and 14a in the front and rear rotary bodies 13 and 14 are defined in opposed outer peripheral end portions of the respective front and rear monofilament guide bodies 15 and 16. By rotation of the front and rear rotary bodies 13 and 14, the monofilament 4 is fed from the spool 8 and continuously wound around a periphery of the mandrel 21 into a coil shape. The monofilament guide hole 19a defined in the upper end of the guide column 19 is positioned substantially on a central axial line of the mandrel 21. A core thread guide groove 21a (see FIG. 5) into which the core thread 2 is fitted and guides the core thread 2 is defined throughout a length of the mandrel 21.

Figure 2:
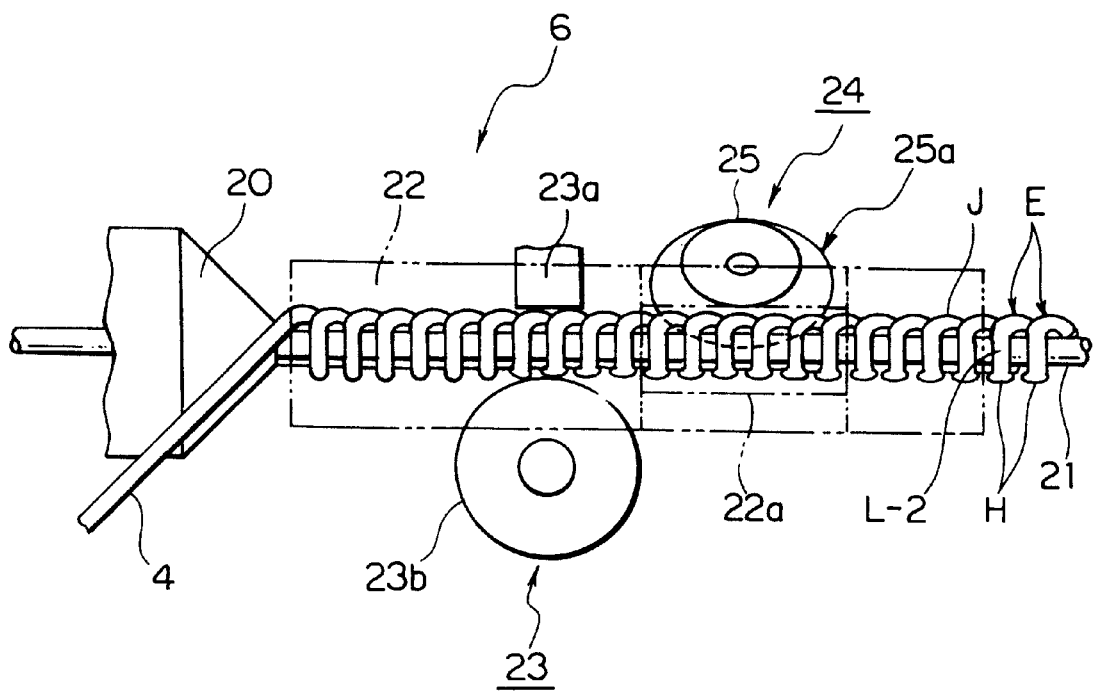
FIG. 2 is a top view schematically showing an example of an element forming unit of the manufacturing apparatus.

FIG. 2 schematically shows an element forming unit 6 which is the most characteristic of the apparatus of the invention. The element forming unit 6 comprises a pair of screws 22 (see FIG. 3) disposed left and right with the mandrel 21 disposed therebetween, a coupling head forming portion 23 disposed above and below to sandwich a base end portion side of the mandrel 21, and an upper leg portion forming portion 24 which is disposed on the front end side of the mandrel 21 near a center of the mandrel 21 with its peripheral face inclined in a direction crossing the coupling head forming portion 23 and which bends and deforms the upper leg portion of the element E into a stepped shape. Out of the pair of left and right screws 22, the screw 22 disposed on a side where the upper leg portion forming portion 24 is disposed has only a screw shaft 22a but lacks a screw portion at an area corresponding to a disposing position of the upper leg portion forming portion 24 such that the screw 22 does not interfere with the leg portion forming portion 24.

Figure 4:
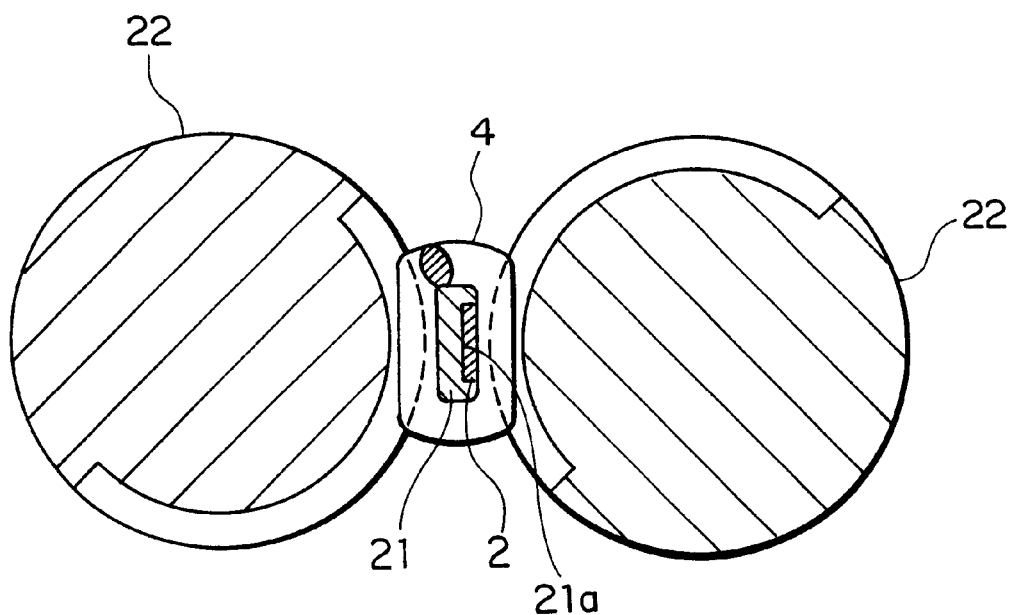
FIG. 4 is a cross sectional view showing an example of a transferring manner of the spiral continuous element row by the manufacturing apparatus.
Figure 5:
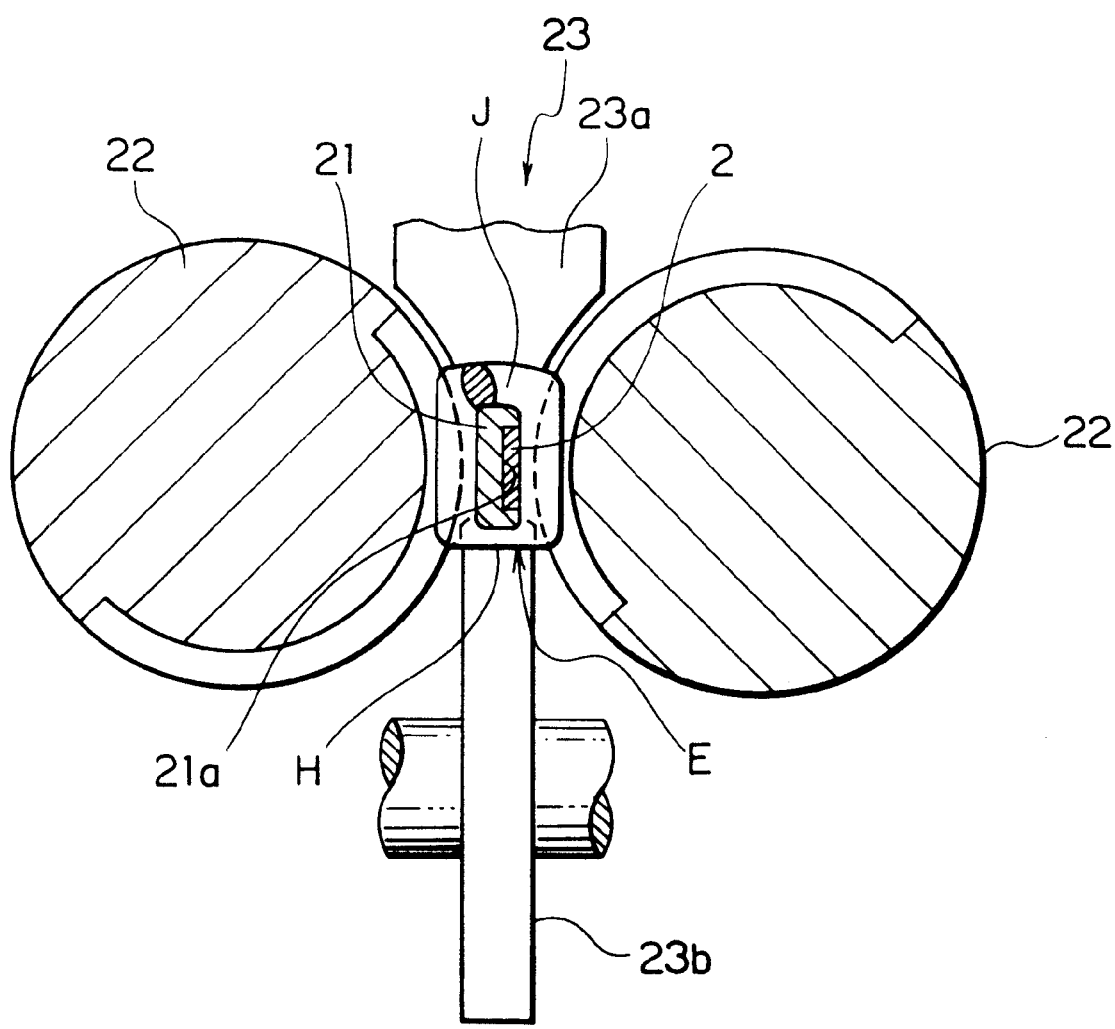
FIG. 5 is a cross sectional view showing an example of a layout of members of a coupling head forming portion of the manufacturing apparatus.
Figure 6:
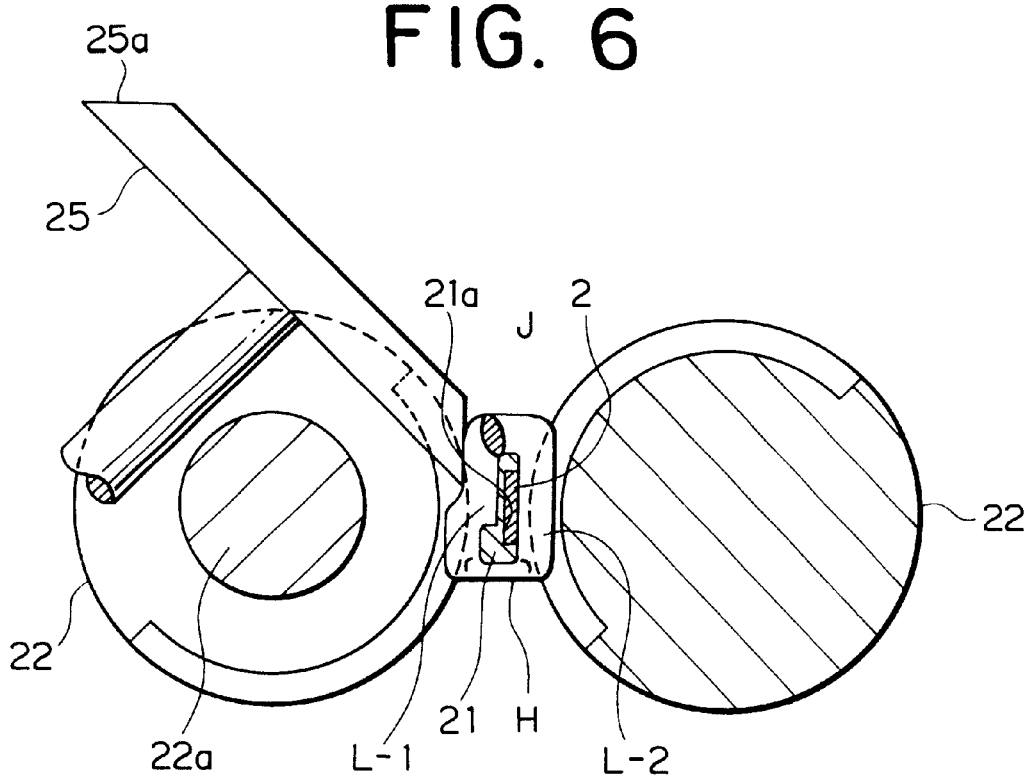
FIG. 6 is a cross sectional view showing an example of a layout of members of an upper leg portion forming portion of the manufacturing apparatus.

A portion of the mandrel 21 from the base end portion to the upper leg portion forming portion 24 has a substantially rectangular shape in section including the rectangular core thread guide groove 21a as shown in FIGS. 4 and 5 and the rest of the mandrel 21 including its portion where the upper leg portion forming portion 24 faces has a substantially L shape in section as shown in FIG. 6. According to the example shown in the drawings, the core thread guide groove 21a is formed in a surface of the mandrel 21 opposite to a bent face of the mandrel 21 having the substantially L shape in section.

Figure 7:
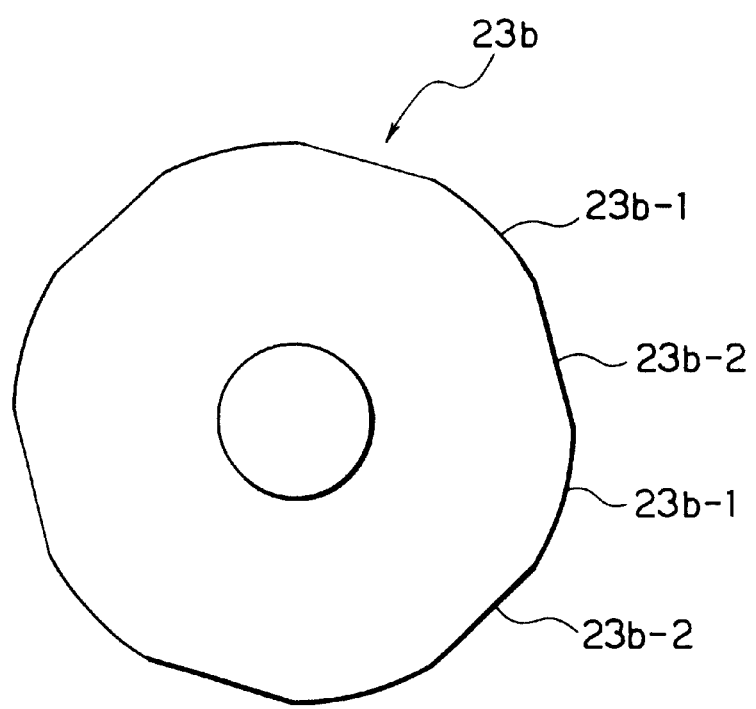
FIG. 7 is a front view of a pressing roller used in the coupling head forming portion.

The coupling head forming portion 23 has a die 23a as a receiving body disposed above the mandrel 21 and a coupling head forming disc 23b which is a coupling head pressing roller serving as a pressing body of the invention disposed below the mandrel 21 as shown in FIG. 5. The die 23a and the coupling head forming disc 23b have spaces between the mandrel 21 and themselves, the spaces being for retaining the joint portion J of the element E and for forming the coupling head H, respectively. The die 23a is fixed to a support frame (not shown) or the like, pinches the joint portion J of the element E with the mandrel 21, and has enough rigidity to receive pressing force of the coupling head forming disc 23b in forming of the coupling head H of the element E by the coupling head forming disc 23b. On the other hand, the coupling head forming disc 23b is driven for rotation about its rotary shaft at a slightly lower speed than the screws 22. As shown in FIG. 7, an outer peripheral face of the coupling head forming disc 23b is consisted of arc portions 23b-1 and chord portions 23b-2 which are formed alternately with each other in a peripheral direction and central angles of the arc portions 23b-1 and the chord portions 23b-2 are equal to each other. However, the central angle of each the arc portion 23b-1 may be larger than the central angle of each the chord portion 23b-2. In such a case, pressing time by the arc portions 23b-1 is longer in forming of one coupling head H, and thus, a necessary form of the coupling head can be obtained reliably.

If a pressing area of each the arc portion 23b-1 is set at a minimum value required for forming of the coupling head H, the central angle is set at an infinitesimal value, and a transferring speed of a spiral filament by the screws is adjusted to be such a value that a plurality of arc portions 23b-1 can press a portion corresponding to the coupling head a plurality of times, forming of one coupling head H is not completed by one pressing operation but by a plurality of pressing operations, thereby forming the coupling head H in a stable form.

Figure 8:
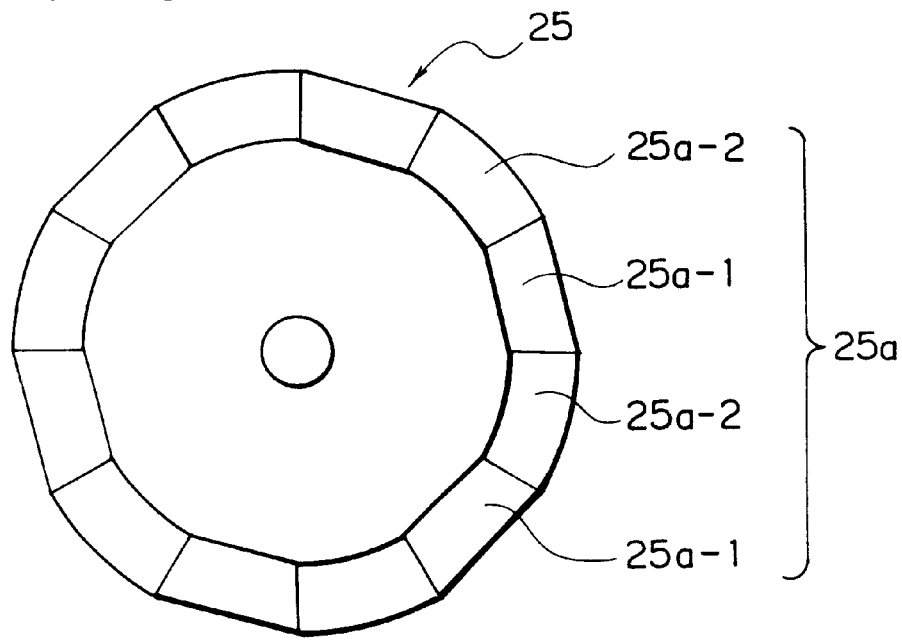
FIG. 8 is a front view of a rotary hammer used in the upper leg portion forming portion.
Figure 9:
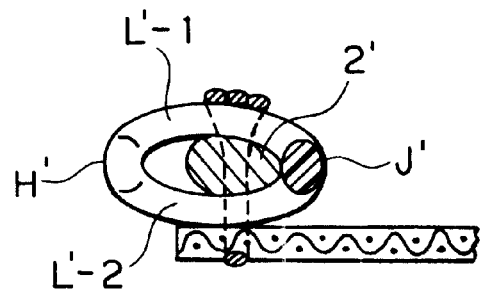
FIG. 9 is a front view of a typical example of a form of a conventional fastener element.
Figure 10:
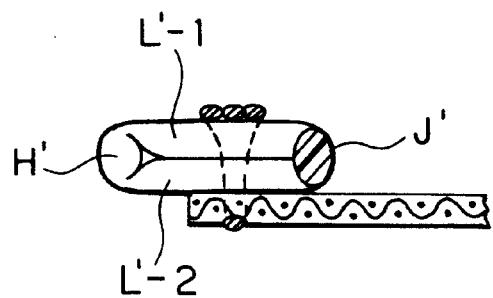
FIG. 10 is a front view of another example of the form of the conventional fastener element.
Figure 11:
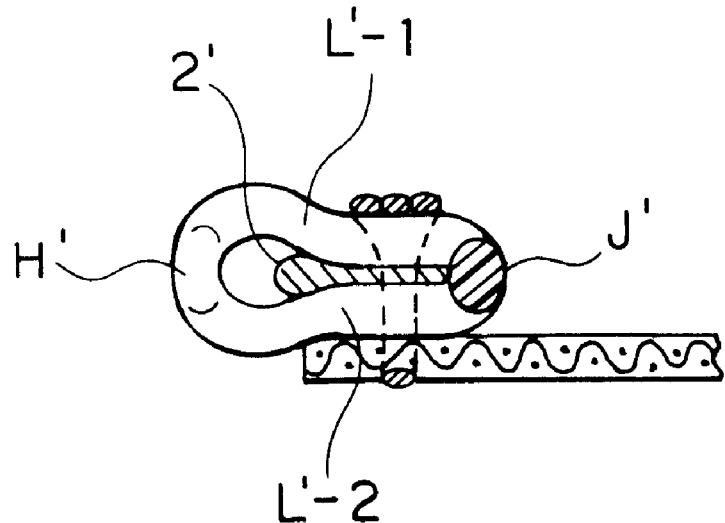
FIG. 11 is a front view of yet another example of the form of the conventional fastener element.
Figure 12:
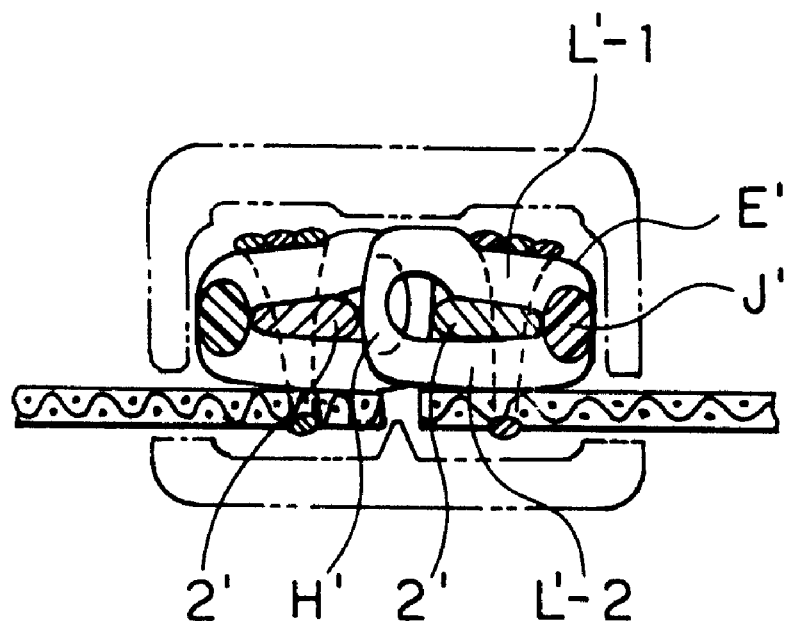
FIG. 12 is a partial sectional view of a slide fastener to which a fastener element in a modified form of the form shown in FIG. 11 is attached.

The upper leg portion forming portion 24 has a truncated cone-shaped rotary hammer 25 serving as an upper leg portion forming pressing body which is secured to an end of a rotary shaft and is disposed with its rotary shaft inclined such that an inclined peripheral face 25a of the rotary hammer 25 presses the upper leg portion L-1 of the element E, as shown in FIG. 6. The inclined peripheral face 25a comprises plane portions 25a-1 and arc face portions 25a-2 bulging into arc shapes which are arranged alternately with each other in a peripheral direction of the peripheral face 25a, as shown in FIG. 8. Although central angles of the plane portions 25a-1 and the arc face portions 25a-2 are equal to each other in the example shown in FIG. 8, it is also possible that the central angle of each the arc face portion 25a-2 is larger than that of the plane portion 25a-1 similarly to the case of coupling head forming disc 23b. If the central angle of each the arc face portion 25a-2 is set at an infinitesimal value while ensuring a necessary minimum area, the upper leg portion L-1 is bent and formed completely not by one pressing operation but by some pressing operations of a portion for the upper leg portion L-1 by the arc face portions 25a-2 so as to obtain a final form of the upper leg portion L-1 in forming of the upper leg portion L-1.

If the form of the rotary hammer 25 is set as described above and the rotary shaft of the rotary hammer 25 is disposed to cross at an acute angle a straight extension connecting centers of the pair of screws, the rotary hammer 25 can interfere with only one of the pair of screws. In order to avoid this interference, the part of the screw portion where the rotary hammer 25 interferes with the screw but the screw shaft portion 22a is removed in the example shown in the drawings. If the screw groove of the other screw faces the inclined peripheral face 25a of the rotary hammer 25, the screw groove facing the rotary hammer 25 reliably receives pressing and hitting force of the rotary hammer 25 acting on the upper leg portion L-1 through the lower leg portion L-2, thereby carrying out stable forming of the leg portions.

According to the apparatus for manufacturing the slide fastener continuous element of the embodiment with the above-described structure, the pair of right and left screws 22 are driven for rotation by the driving device (not shown), and at the same time, the rotary shaft 13 of the winding unit 5, the coupling head forming disc 23b of the coupling head forming portion 23, and the truncated cone-shaped rotary hammer 25 of the upper leg portion forming portion 24 start rotating in synchronism with each other.

By the above rotation, the monofilament 4 drawn out vertically upward from the spool 8 of the monofilament supply unit 1 is turned into a horizontal direction through the guide roller 10, passes through the guide holes 13a, 14a of the front and rear rotary bodies 13 and 14 which are rotating at a high speed, and is wound around the mandrel 21 extending forward. Although the monofilament 4 drawn out vertically upward from the spool 8 is slightly twisted in one direction while being wound around the spool 8, the monofilament 4 is untwisted when drawn vertically upward, and brought into a substantially non-twisted state when the monofilament 4 passes through the guide roller 10 and is wound around the mandrel 21.

Figure 3:
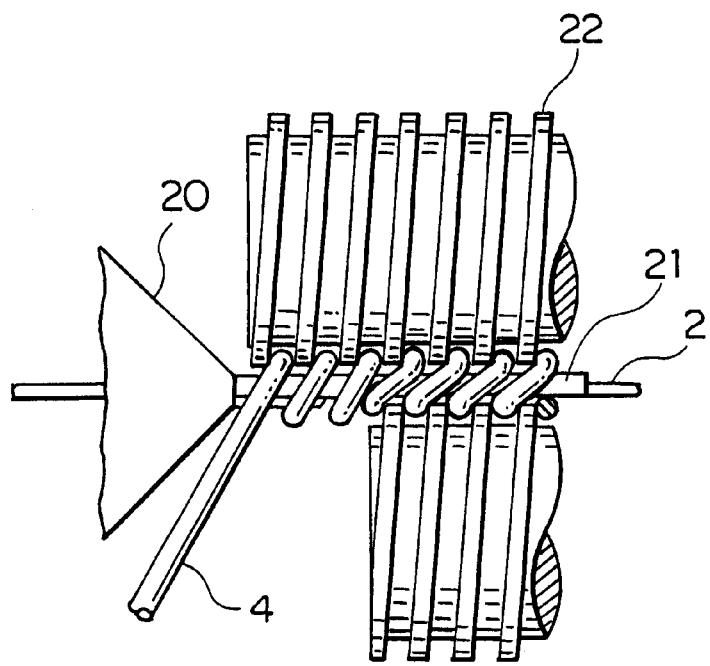
FIG. 3 is a side view showing a layout of a part of a pair of screws applied to the manufacturing apparatus.

The monofilament 4 wound around the mandrel 21 is transferred forward with a predetermined pitch and in a coil shape by rotation of the right and left screws 22 disposed along the mandrel 21. In this transfer, the monofilament 4 is fitted in the screw grooves and the pitch is gradually increased. By the time the monofilament 4 passes through a certain transfer distance, the respective element units are arranged with a necessary pitch, as shown in FIG. 3. In transfer of the coil-shaped monofilament 4, the monofilament 4 first reaches the coupling head forming portion 23 where the coupling head H is formed for each the element E of the coil-shaped monofilament 4 (see FIG. 5).

Then, the coil-shaped monofilament 4 in which the coupling heads H are formed is transferred further by the screws 22. When the monofilament 4 reaches a portion which lacks the screw 22, i.e., the upper leg portion forming portion 24, the arc face portions 25a-2 of the truncated cone-shaped rotary hammer 25 repeatedly hits for some times the portion of the upper leg portion L-1 of the element E near the joint portion J toward the lower leg portion L-2 as described above, so that the portion of the upper leg portion L-1 from some midpoint thereof to the joint portion J is bent and formed in a stepped manner to narrow a space between the upper leg portion L-1 and the lower leg portion L-2, thereby forming a final element form of the coil-shaped element row.

As described above, according to the invention, an accurate pitch of the elements carried on the mandrel 21 is ensured even in a high-speed operation. Furthermore, it is possible to form the coupling head for each the element unit in sequence during carrying of the monofilament 4 on the mandrel 21 and to bend and form the upper leg portion L-1 on the joint portion side in a stepped manner to narrow a space between the upper and lower leg portions L-1, L-2. Thus, the continuous coil-shaped element row with high quality can be manufactured efficiently.

The above embodiment is a representative example of the invention and is not limited to the example shown in the drawings.

What is claimed:

1. An apparatus for continuously manufacturing a spiral slide fastener element row from a continuous monofilament made of synthetic resin, comprising
   - a pair of screws disposed in parallel to each other in a longitudinal direction and rotating in the same direction,
   - a mandrel extending in parallel to said screws between said pair of screws and having a substantially rectangular shape or an oval shape in section,
   - a coupling head forming portion disposed between said pair of screws so as to sandwich said mandrel and having a receiving body on one side and a coupling head forming pressing body for forming coupling heads of elements on the other side, and
   - an upper leg portion forming portion disposed on a front end side of said mandrel so as to be orthogonal to said coupling head forming portion,
   - wherein said front end side of said mandrel where said upper leg portion forming portion is disposed is formed into a bent portion having a substantially L shape in section, and
   - wherein said upper leg portion forming portion has an upper leg portion forming pressing body for pressing and deforming said monofilament in a stepped manner substantially along an inner face of said bent portion so as to eliminate a space formed between said bent portion and an inner peripheral edge of said monofilament wound around said bent portion.

2. An apparatus for manufacturing a slide fastener element row according to claim 1, wherein said mandrel has a guide groove for guiding a core thread and formed from a base end portion to said bent portion of said mandrel.

3. An apparatus for manufacturing a slide fastener element row according to claim 1, wherein said upper leg portion forming portion comprises one of said screws and a rotary hammer disposed to face a screw groove of said screw.

4. An apparatus for manufacturing a slide fastener element row according to claim 3, wherein said rotary hammer is disposed such that an axial line of a rotary shaft of said rotary hammer crosses at an acute angle a straight extension connecting rotational centers of said pair of screws.

5. An apparatus for manufacturing a slide fastener element row according to claim 1, wherein said coupling head forming pressing body is a pressing roller.

6. An apparatus for manufacturing a slide fastener element row according to claim 3, wherein a peripheral edge portion constituting a pressing face of said rotary hammer is formed into polygon when viewed in rotary shaft direction of said rotary hammer.

7. An apparatus for manufacturing a slide fastener element row according to claim 5, wherein a peripheral edge portion constituting a pressing face of said pressing roller is formed into polygon when viewed in rotary shaft direction of said pressing roller.

* * * * *